July 9, 1968     LE ROY R. BOGGS     3,391,422
APPARATUS FOR MAKING CURVED FIBER REINFORCED
RESIN ARTICLE
Filed Nov. 3, 1964     5 Sheets-Sheet 1
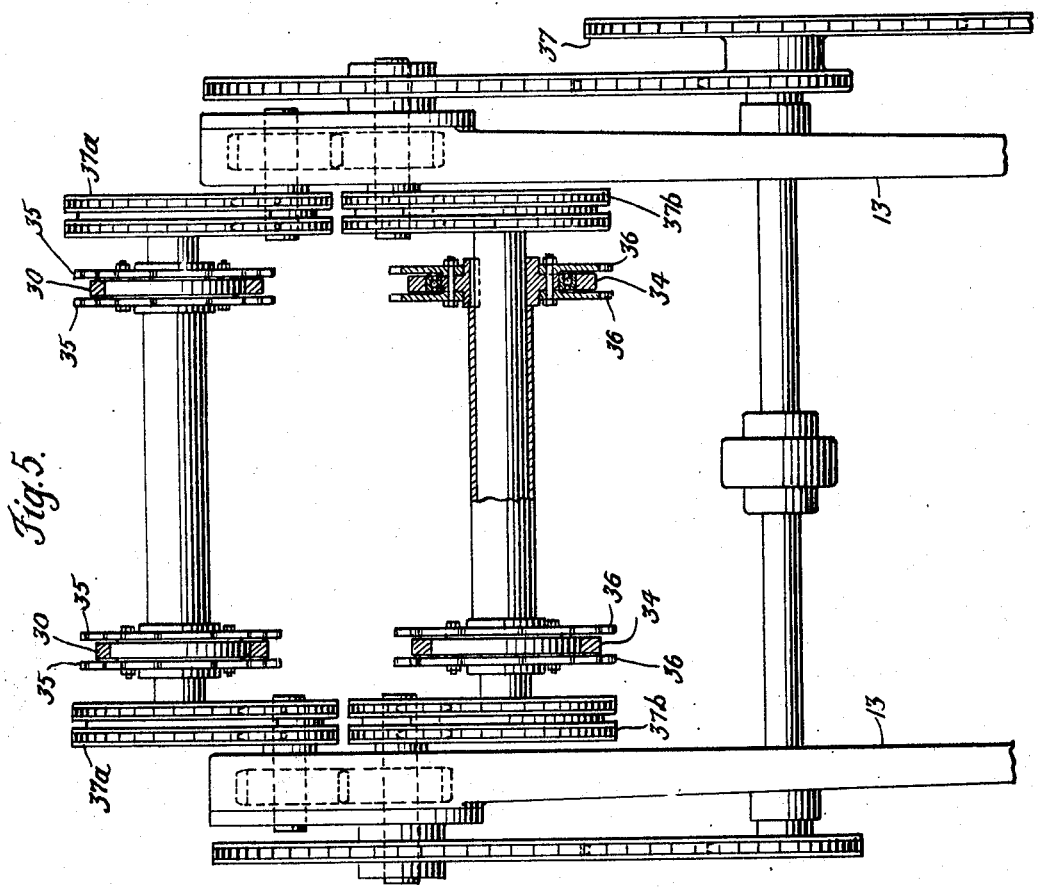
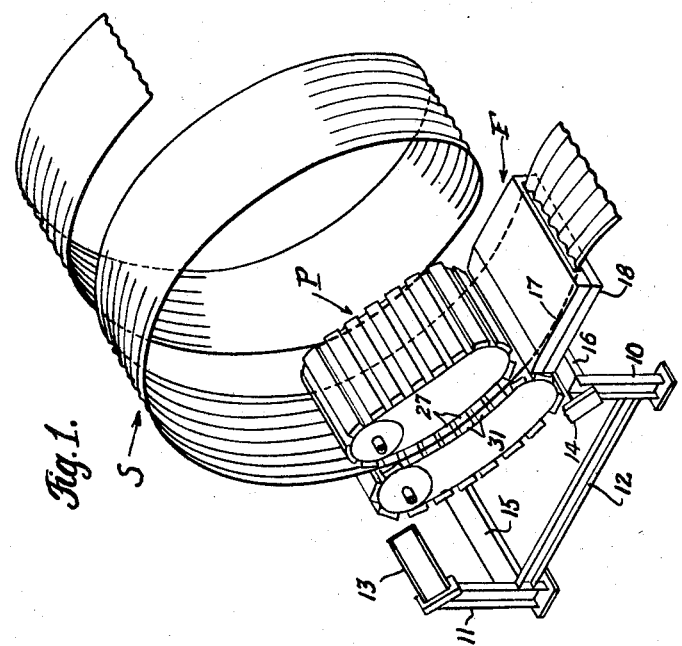

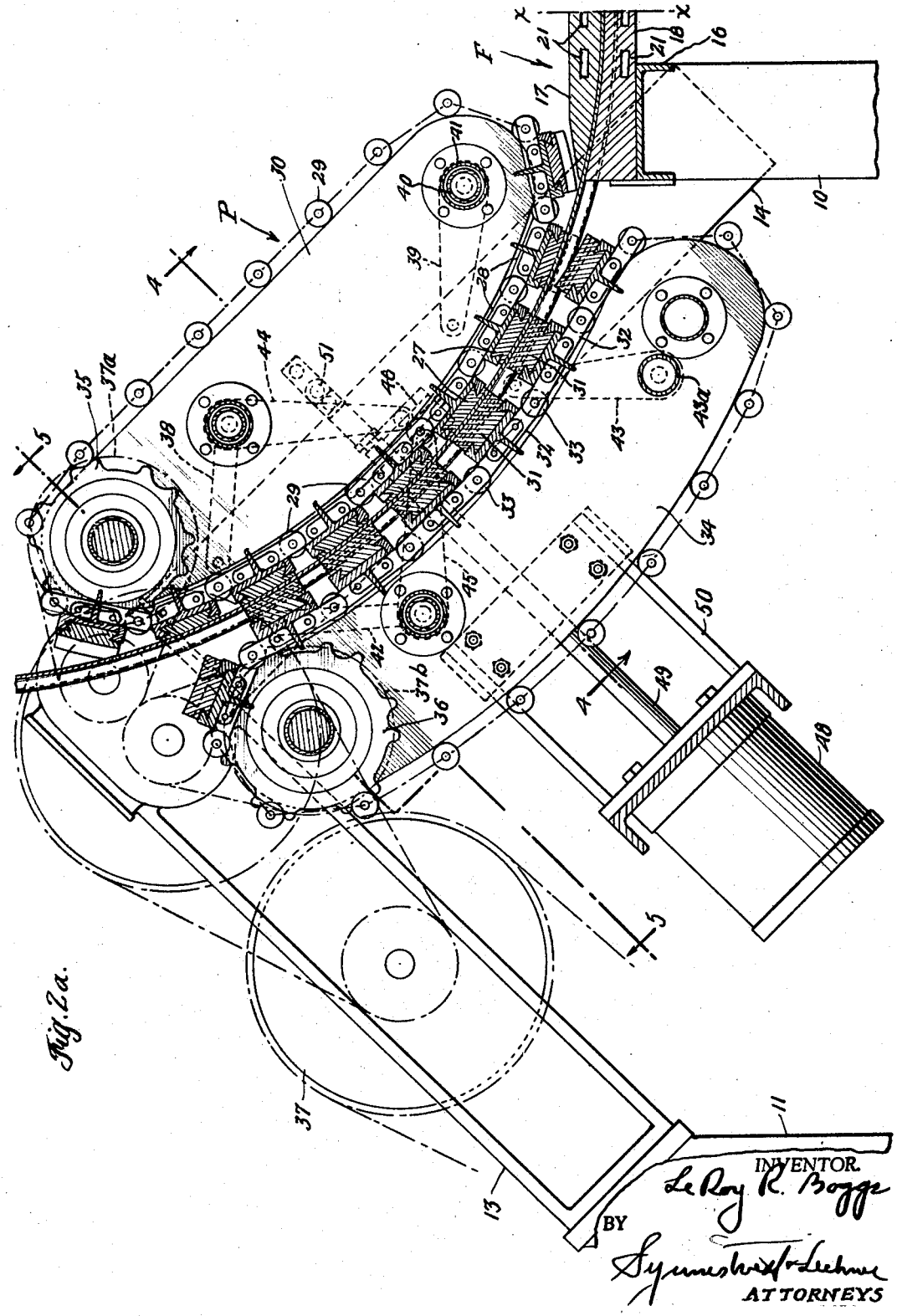

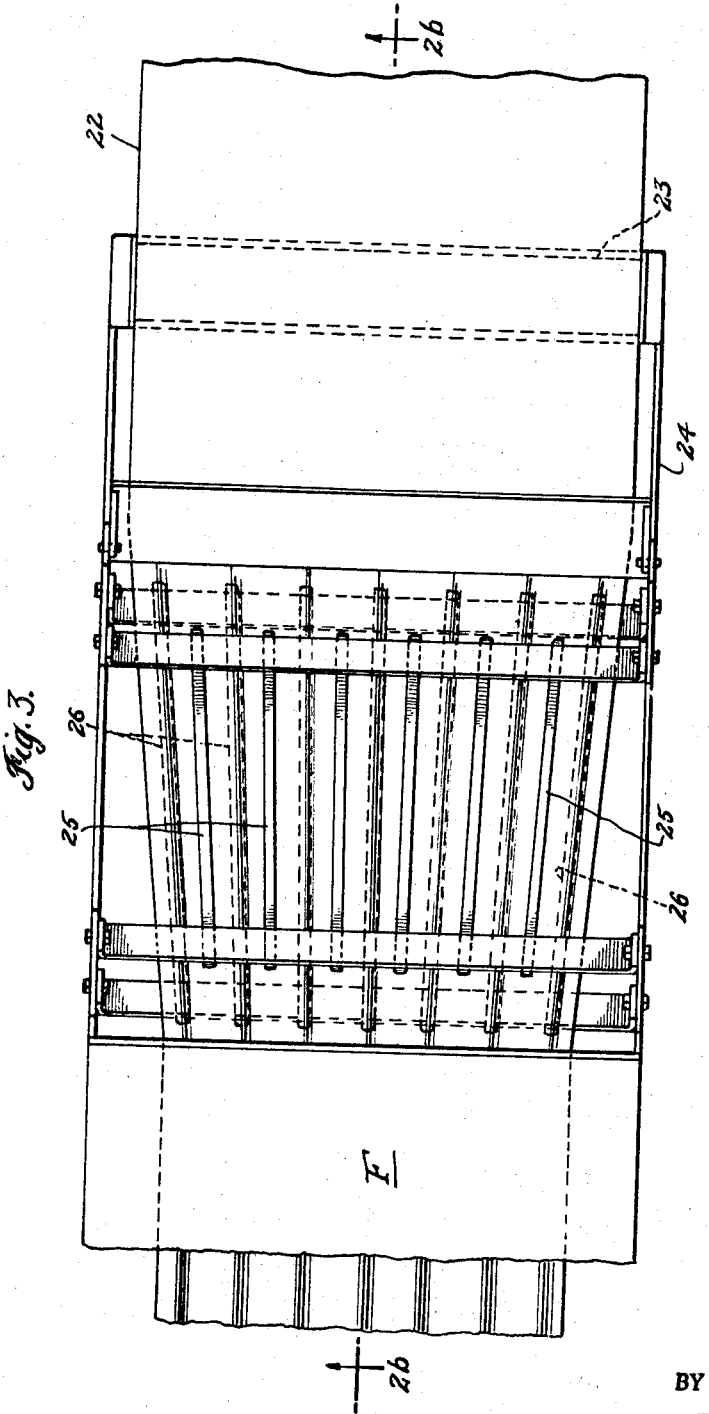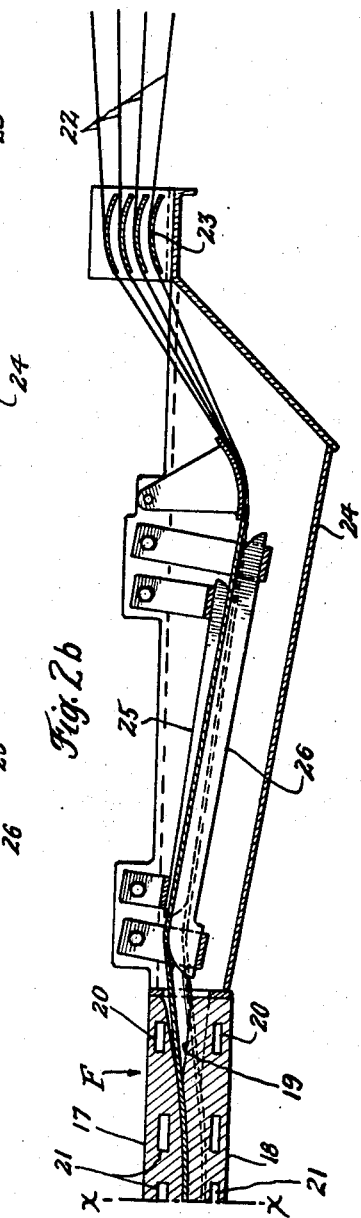

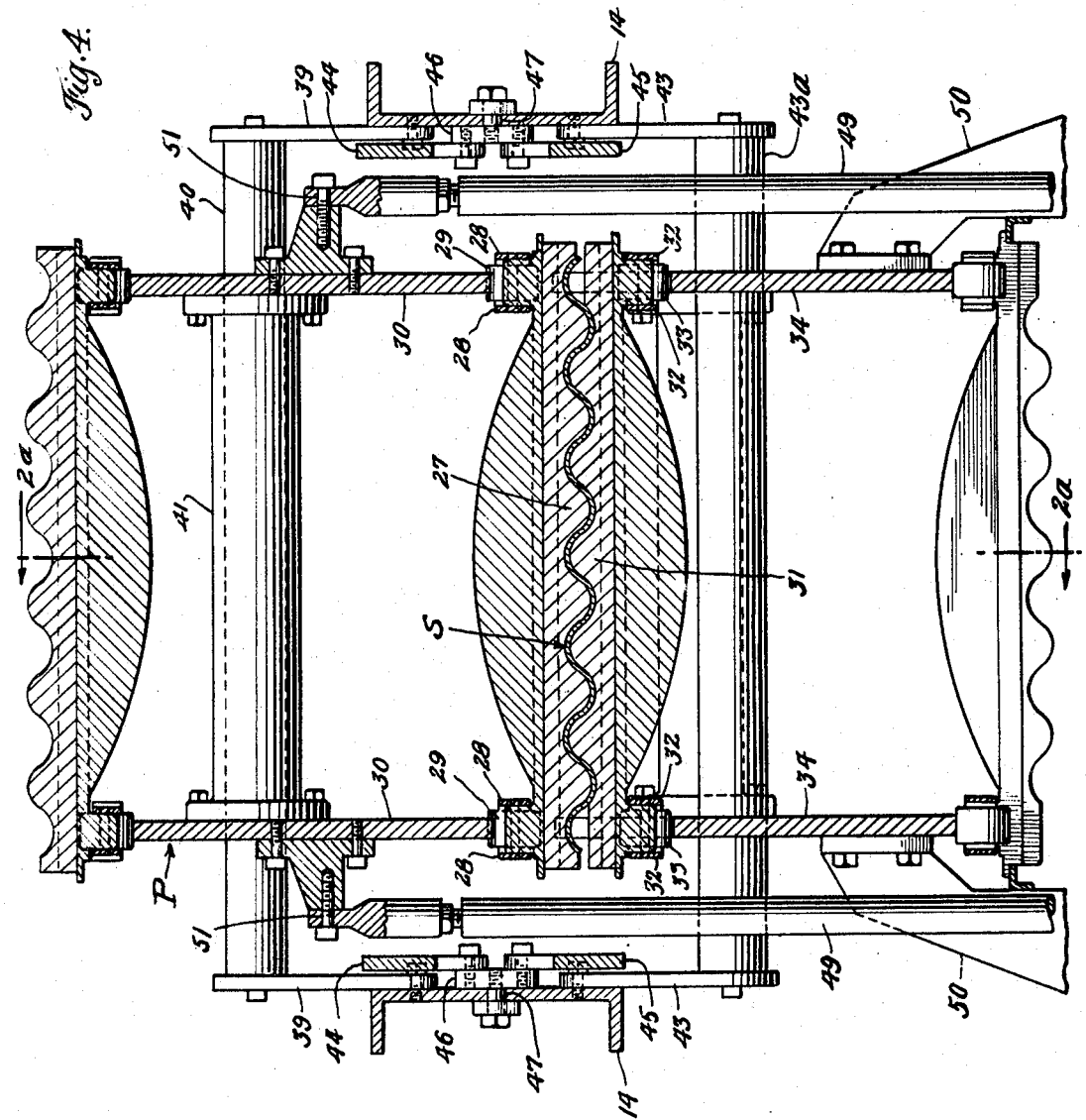

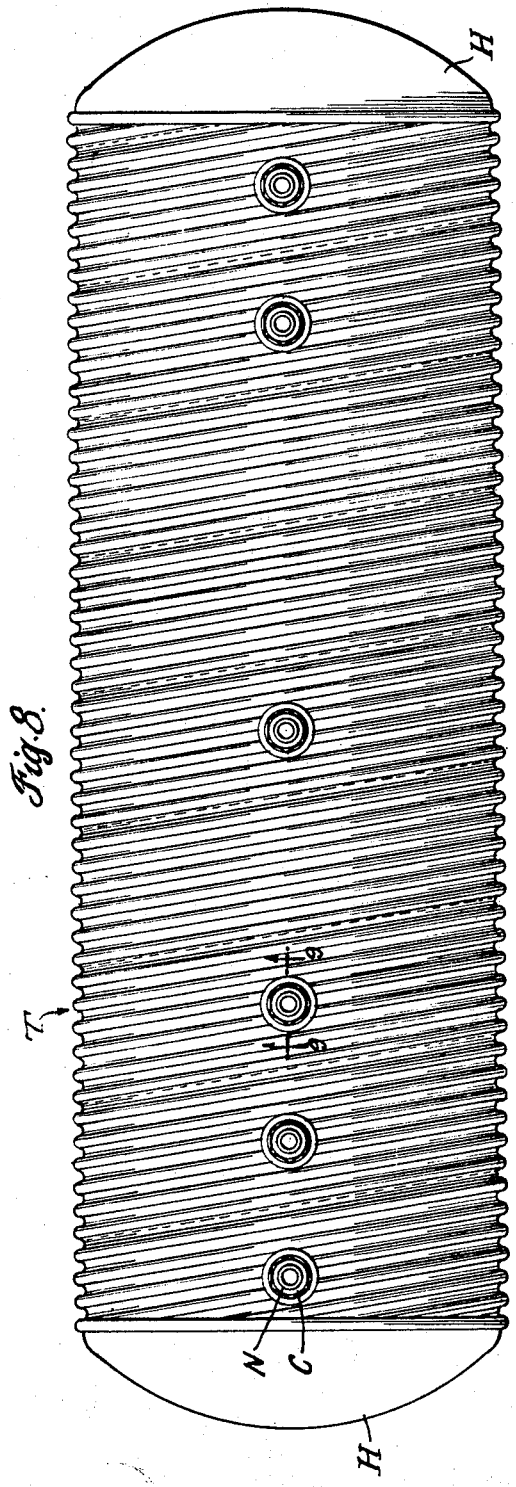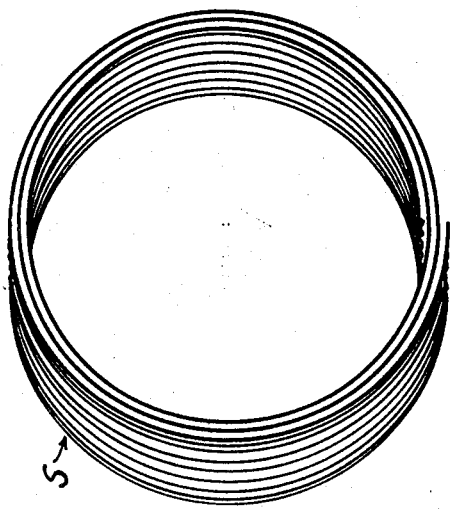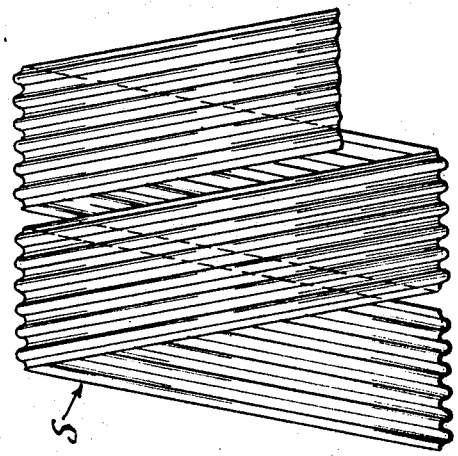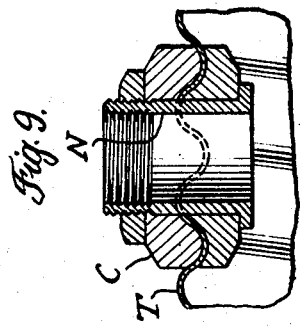

United States Patent Office 3,391,422
Patented July 9, 1968

3,391,422
APPARATUS FOR MAKING CURVED FIBER
REINFORCED RESIN ARTICLE
Le Roy R. Boggs, Bristol, Tenn., assignor, by mesne assignments, to Koppers Company, Inc., Pittsburgh, Pa., a corporation of Delaware
Filed Nov. 3, 1964, Ser. No. 408,591
7 Claims. (Cl. 18—4)

ABSTRACT OF THE DISCLOSURE

Apparatus for making curved fiber reinforced articles comprises a forming device having a passage shaped to the desired cross section of the article and curved from inlet to outlet. Means is provided for heating fiber reinforced resin material passing through the passage, and a puller mechanism engages and pulls on the solidified article. The puller mechanism has curved article-gripping surfaces that conform to the cross sectional shape of the article.

---

This invention relates to curved fiber reinforced resin articles and the production thereof. The invention is particularly concerned with equipment for producing such curved articles and is also concerned with a special manner of use of such articles, as will further appear.

It has been known to produce curved fiber reinforced resin articles by the so-called "hand lay-up" method, according to which fibrous reinforcement impregnated with a liquid heat hardenable resin is laid upon a form or in a mold, heat is applied and after solidification of the resin, the article is removed.

In my copending application Ser. No. 188,111 filed Apr. 17, 1962, now abandoned, I have disclosed a method for production of continuous lengths of curved pieces by drawing resin impregnated reinforcement through a straight forming passage, heating the resin material in the passage to solidify the piece, and effecting the drawing at an angle to the axis of the forming passage. In this way, as disclosed in said copending application, it is possible to produce pieces of some curvature.

While the hand lay-up method is capable of producing an article having any degree of curvature, the hand lay-up technique is of course time consuming and inefficient; and on the other hand, while the technique of my abandoned prior application 188,111 is efficient, it is nevertheless limited with respect to the degree of curvature which may be imparted to a piece.

The present invention is concerned with equipment by which fiber reinforced resin articles of any desired curvature may readily be made in continuous lengths in an efficient manner.

In addition to the major objective just referred to, the invention also contemplates production of curved pieces of special configuration particularly adapted to the production of tubular structures therefrom, notably tubular tanks, for instance tanks of the order of four or five feet in diameter and of any desired length.

How the foregoing objects and advantages are attained, together with others which will occur to those skilled in the art will appear more fully from the following description referring to the accompanying drawings in which:

FIGURE 1 is an outline isometric view of equipment according to the present invention producing a curved strip, which is shown issuing from the machine in the form of a helix;

FIGURES 2a and 2b, taken together along line x—x comprise a vertical sectional view through various parts of the equipment, this view being on a considerably larger scale than FIGURE 1, certain parts being shown in elevation, and the portion 2a of this view being taken as indicated by the line 2a—2a on FIGURE 4, and the portion 2b of this view being taken on the line 2b—2b on FIGURE 3;

FIGURE 3 is a plan view of the parts of the equipment shown in FIGURE 2b;

FIGURE 4 is a vertical sectional view taken as indicated by the line 4—4 on FIGURE 2a;

FIGURE 5 is a view taken as indicated by the line 5—5 on FIGURE 2a;

FIGURE 6 is an elevational view of a portion of the curved piece being produced in accordance with FIGURE 1, the piece also here being shown with the turns helically disposed;

FIGURE 7 is a somewhat diagrammatic view of a piece of the article of FIGURE 6 but shown with the turns thereof arranged spirally, rather than helically;

FIGURE 8 is a view of a piece such as shown in FIGURES 6 and 7 assembled to form a tubular structure, such as a tank; and FIGURE 9 is an enlarged view of a detail of the structure shown in FIGURE 8, the view being taken as indicated by the line 9—9 on FIGURE 8.

By way of example, the illustrative equipment hereinafter described is arranged to produce a continuous length of a strip type product having lengthwise corrugations. Such a corrugated strip is indicated by the letter S in FIGURE 1, and is there shown as being formed in a forming device F having a corrugated forming passage therein which is curved from the inlet end of the passage to the discharge end, the strip being drawn through the forming device by means of the curved puller mechanism generally indicated at P, and the strip issuing from the puller mechanism in curved form and being deflected to one side of the equipment (toward the right as viewed in FIGURE 1) so that the coils of the strip assume the configuration of a helix. Such a corrugated and curved strip is particularly adapted for use in the formation of tubular articles, such as the tank shown in FIGURE 8, which is described more fully hereinafter.

The apparatus which is illustrated in a general or outline manner in FIGURE 1 is shown in greater detail in FIGURES 2a, 2b, 3, 4 and 5, to which reference is now made.

The forming device F and the puller P are mounted in common by means of frame or supporting structure including supporting posts 10 and 11 which are interconnected by lower beams 12 (see FIGURE 1) and also by relatively angled beams 13 and 14 which are joined to each other toward their upper ends. Transverse beams 15 and 16 interconnect the two side portions of the frame structure, thereby providing not only cross bracing but also for support of certain of the devices of the mechanism. Thus as will be seen in FIGURE 2a the transverse beam 16 serves to mount the forming device F. In addition the inclined members 14 desirably take the form of channel members (see FIGURE 4) which in effect comprise a general frame structure for mounting the crawler treads of the puller mechanism.

In the particular embodiment illustrated, the forming device is adapted to the formation of a corrugated strip, as noted above, and for this purpose the forming device is desirably made up of upper and lower die parts 17 and 18 which when assembled provide a curved forming passage which is transversely corrugated. The die parts are also shaped toward the entrance end of the forming passage to provide a tapered inlet opening as indicated at 19 in FIGURE 2b, this taper being provided for the purpose of effecting progressive compression of the resin impregnated reinforcement elements as they enter the forming passage. Toward the inlet end, the die parts 17 and 18 are provided with passages 20 for circulation of a cooling medium, for instance water at ordinary supply temperatures, which is of importance in order to maintain the temperature of the resin entering the die below the solidification point.

The intermediate portion of the die parts 17 and 18 are provided with passages 21 providing for circulation of a heating medium, for instance steam, so as to raise the temperature of the resin as it is passing through the forming passage sufficiently to effect solidification of the article in that region of the forming passage, i.e., the region in which the forming passage is of substantially uniform cross section substantially conforming with the shape of the article being made. In this way the article delivered from the forming passage is in solid condition and may be engaged by the puller mechanism in order to draw the materials into the system and to draw the formed and solidified article from the forming passage.

Reinforcement elements to be employed, for instance a plurality of plies of fiber reinforcement strips indicated at 22 are fed from suitable sources of supply (not illustrated) over guide members 23 and into a path of liquid resin contained in the reservoir 24 which is mounted at and on the entrance end of the forming device F. Because the article here being made has transverse corrugations, the webs or reinforcement strips 22 fed to the equipment are desirably of width substantially in excess of the overall width of the finished strip, thereby providing sufficient width of reinforcement strip to permit the limited folding which is required when the material is shaped to the corrugated form of the sheet being made. For this purpose upper and lower interleaving guides 25 and 26 are arranged in the resin pan 24 with their ends remote from the forming device F spaced farther from each other than the ends thereof adjacent to the entrance end of the forming device, as clearly appears in FIGURE 3. These "folding" devices bring the reinforcement plies to the approximate configuration of the corrugated section of the strip being made. Referring now particularly to FIGURES 2a, 4 and 5, it will be seen that the puller mechanism P comprises a pair of crawler treads of special form in which the tread members are adapted to follow an arcuate path representing a continuation of the curvature of the forming passage in the forming device F.

Thus, the upper tread comprises a series of gripping elements or devices 27 which are respectively mounted on tread links 28 arranged in pairs at each side of the tread, the tread links being pivotally interconnected and provided with rollers 29 adapted to ride on the guide plates 30, one of which is arranged toward each side of the tread (see also FIGURE 4). The guide plates 30 are provided with convex roller guiding surfaces presented toward the other crawler tread and with straight guide surfaces at the upper side (presented away from the other crawler tread).

Similarly the lower crawler tread comprises gripping devices 31 mounted by means of pairs of tread links 32 arranged at each side of the tread and pivotally interconnected and provided with rollers 33 riding on guide plates 34 one of which is positioned toward each side of the tread. The guiding edges of the plates 34 presented toward the upper tread are concave, and the guiding edges for the opposite run or the lower run are convex, as clearly appears in FIGURE 2a.

Attention is now called to the fact that each of the treads isprovided with an equal number of gripping devices and links, the gripping devices being adapted to cooperate in pairs, as will be clear from inspection of FIGURE 2a. However, it will be noted that the links 32 of the lower tread are of greater length than the links 28 of the upper tread. In this way provision is made for retaining the links in paired relation during operation of the puller mechanism.

Each of the crawler treads is provided with driving sprockets arranged toward opposite sides of the tread, the sprockets for the upper tread being indicated at 35 and the sprockets for the lower tread at 36. The sprockets 35 and 36 are provided with teeth adapted to engage the rollers 29 and 33 in order to effect advancement of the two treads and because the links of the lower tread are longer than those of the upper tread, the sprockets 36 for the lower tread are of greater diameter than the sprockets 35 for the upper tread. The angular spacing of the sprocket teeth however is the same for all sprockets. These sprockets 35 are adapted to be mounted or journalled toward the end of the plates 30 of the upper tread, portions of the plates 30 being indicated in FIGURE 5 in between the paired sprockets which are provided toward each side of the tread.

A similar arrangement is employed for the sprockets 36 for the lower tread, as will also be seen in FIGURE 5, where portions of the guide plates 34 appear between the paired sprockets toward each side of the tread. This sprocket mounting arrangement is illustrated in detail in my application Ser. No. 142,749, filed Sept. 18, 1961, which issued Oct. 6, 1964, as Patent No. 3,151,354. In said application there is disclosed a puller mechanism incorporating a pair of crawler treads arranged for use in the pulling of a formed piece in a straight line, rather than in a curved path. In addition, said application also discloses a drive system for delivering power to the tread sprockets, including various of the drive chain, gearing and sprocket devices seen in FIGURES 2a and 5, including the power driving sprocket 37 and the driven sprockets 37a and 37b, but since these parts are arranged in the same manner as in said application and since they form no part of the present invention per se, they are not described in detail herein. However, it is here noted that the driven sprockets 37a and 37b are of the same size notwithstanding the fact that the tread driving sprockets 35 and 36 respectively associated therewith are of different sizes. This relationship is provided in order to ensure maintenance of the paired relation of the gripping elements of the two treads during operation.

Returning again to the guide plates 30 and 34 for the two sprocket treads, attention is now called to the fact that in effect the plates 30—30 comprise a frame structure for the upper crawler tread and the plates 34—34 comprise a frame structure for the lower crawler tread. The crawler plates 30—30 are mounted for orbital motion by means of arms 38 and 39 which are pivoted to the frame channels 14. Each of the pairs of arms 38 and 39 are connected with frame plates 30—30 in the manner illustrated in FIGURE 4 for arms 39, which, as there shown, are connected with the cross shaft 40 which extends through the sleeve 41 extended between the frame plates 30—30. Similarly arms 42 and 43 serve to mount the frame plates 34—34 of the lower crawler tread for orbital motion, the arms 42 and 43 being pivoted to the frame member 14. As seen in FIGURE 4 the arms 43 are connected with a cross shaft 43a extended through the frame plates 34—34. A similar arrangement is employed for the arms 42—42 for the lower tread, these arrangements all being similar to those referred to in my application above identified and they need not be considered in any more detail herein. It is pointed out, however, that by virtue of the mounting of the two crawler treads for orbital motion, the treads and the gripping elements carried thereby are both movable with respect to the curved feed path, and the motion of the two crawler treads in this respect is coordinated by means of the pairs of pivotal arms 44 and 45, each pair being pivotally connected with a block 46 having a projection 47 adapted to slide in a longitudinal slot formed in the associated frame member 14. This ensures that the two treads will move together toward and away from the mean feed path between the gripping elements in the manner more fully explained in the application 142,749 fully identified above.

The two treads are adapted to be yieldingly urged toward each other by means of pneumatic piston and cylinder devices, each including a cylinder 48 and piston with a rod 49. The cylinders are connected with the plates 34 for the lower crawler tread by means of brackets 50 and the piston rods are connected with the plates 30 of the upper crawler tread as indicated at 51. In this way the pairs of gripping devices 27–31 of the crawler treads may be yieldingly urged toward each other in order to yieldingly grip the piece being made.

As seen in FIGURE 4 the gripping surfaces of the gripping elements 27 and 31 of the upper and lower crawler treads are transversely corrugated in order to mate with the corrugations of the strip S being made.

From FIGURE 2a it will be seen that the puller mechanism is "closely coupled" so to speak, with the discharge end of the forming device. Thus, the gripping elements 27 of the upper crawler tread move into position to engage the formed piece at a point very shortly beyond the delivery of the piece from the discharge end of the forming device. This is of importance in order to maintain the desired curvature in the piece as it is delivered from the forming device and enters the puller mechanism.

In accordance with the foregoing provision is made for forming continuous lengths of strip or sheet material, in this instance of corrugated form and having a longitudinal curvature. As the piece is delivered from the equipment, as indicated in FIGURE 1, the turns may be slightly deflected to one side of the machine and thereby delivered from the machine in the manner of the turns of a helix.

The equipment as described above provides for production of pieces of substantial curvature, such, for example, as would be appropriate in the production of ducts, conduits or tanks of cylindrical form, for instance various liquid storage tanks, an example of which is shown in FIGURE 8. It will be understood that the equipment of the invention is adapted to the production of a variety of curved pieces, including pieces other than those in strip or sheet form, such as curved channels, angles, I-beams, or other desired shapes.

Although the technique of the invention may be utilized in connection with the production of pieces incorporating a variety of reinforcements, one particularly useful reinforcement employed in pieces of the kind referred to is glass fiber reinforcement, for instance in the form of strips or sheets made up of mats having random orientation of fibers, or strips of woven fabrics made of threads incorporated as both warp and woof. Various combinations of reinforcements may of course be employed for specialized purposes, including not only strip type reinforcements of the kinds mentioned, but further including rovings or threads or even metal pieces such as strips or screening.

The resins to be employed are advantageously laminating type resins, for instance the polyester resins having a liquid stage and being heat hardenable to the solid stage so that impregnation of the reinforcement may be effected with liquid resin in the resin pan 24 and the resin may thereafter be solidified within the forming device F before being drawn therefrom by the curved puller mechanism.

In the typical example herein illustrated a helical piece such as is produced in the manner illustrated in FIGURE 1 may be cut off in desired lengths and a length of such a piece may readily be coiled in spiral form in the manner illustrated in FIGURE 7. In this form a piece of considerable length becomes a relatively compact package for purposes of shipping and handling and in a typical utilization of such a piece, it may be shipped to a destination of use at which point it is desired to construct and install a tank, for instance a tank such as shown in FIGURE 8. For this purpose the spiralled turns as shown in FIGURE 7 may be drawn out again to helical form generally as indicated in FIGURE 6, and the adjacent edges of the turns may then be overlapped to the extent of the nearest corrugation, thereby providing a cylindrical structure such as illustrated in FIGURE 8. The structure may be employed for certain in that form as a duct or conduit without even securing the overlapped edges together. However, for various other conduit purposes and also for purposes of tank production, it is further contemplated that the overlapped corrugations at the adjacent edges of the turns be adhesively bonded to each other, for instance by the well known epoxy type of adhesive. In this way a conduit or tank of great strength is provided, the corrugations serving not only for increase of peripheral rigidity and transverse strength, but also for accuracy, tightness and strength of the joint between the adjacent edges of the turns.

In the case of production of a tank, for instance a gasoline or other liquid storage tank, the ends of the principal body portion of the tank may be cut off to a plane perpendicular to the axis of the tank, and a head or end closure such as indicated at H in FIGURE 8 may then be applied, joined to the body portion, preferably by the use of an adhesive such as already mentioned. The heads H may be made either of metal or of fiber reinforced resin material, as desired. The tank may be provided with any desired number of connection joints, such as indicated in FIGURE 9 in which the wall of the formed tank indicated at T is shown as being provided with an aperture of diameter equal to the transverse dimension of about one complete corrugation. Specially formed clamping pieces C having mating surfaces conforming with the corrugations of the tank may be provided in order to form a sleeve in which to fasten a threaded nipple N by which pipe or hose connections may be made to the interior of the tank.

I claim:

1. Apparatus for making elongated longitudinally curved resin articles comprising a forming device having a forming passage therein for receiving a heat hardenable liquid resin material, the passage having a cross sectional shape substantially conforming with the cross sectional shape of the article being made and being curved from the inlet opening to the outlet opening thereof, means for heating the resin material to solidify it while it is passing through said passage, and a puller mechanism for pulling the solidified article from the outlet opening, the puller mechanism comprising opposed pairs of pulling elements having gripping surfaces arranged to engage the article being made along a curved feed path representing a continuation of the curved feed path through the forming passage.

2. Apparatus according to claim 1 in which the pulling mechanism comprises a pair of crawler treads each incorporating a series of the puller elements, one of the crawler treads having a concave track for guiding its series of elements along the convex side of the curved feed path and the other of the crawler treads having a convex track for guiding its series of elements along the concave side of the feed path.

3. Apparatus for making resin articles comprising a device for shaping the article and mechanism for pulling the shaped article in a curved feed path from the shaping device including a pair of crawler treads each having a series of tread links carrying gripping elements adapted to engage the shaped article, one of the crawler treads having a concave track for guiding its series of gripping elements along the convex side of the curved feed path and the other of the crawler treads having a convex track for guiding its series of gripping elements along the concave side of the curved feed path.

4. Apparatus according to claim 3 in which the crawler treads each comprise a series of links and pivots interconnecting the links in a closed loop, the apparatus further including drive sprockets for driving the crawler treads, each drive sprocket having spaced teeth for engaging the link pivots, the spacing of the sprocket teeth and of the link pivots engaged thereby being greater for the crawler tread having the concave track than for the crawler tread having the convex track, the drive sprocket with the teeth of greater spacing being of larger diameter than the other sprocket, and means for driving the sprockets synchronously and at the same speed.

5. Apparatus according to claim 3 in which the gripping elements of the two crawler treads are arranged in pairs to grip the article being made at opposite sides thereof, and drive mechanism for the crawler treads providing for maintenance of the paired relation of said gripping elements.

6. Apparatus according to claim 3 and further including mounting means for the crawler treads arranged to provide for movement of the crawler treads toward and away from the curved feed path of the article being made.

7. Apparatus for making resin articles comprising a forming device having a forming passage therein for receiving a heat hardenable liquid resin material, the passage having transversely corrugated cross sectional shape curved from the inlet opening to the outlet opening thereof to provide for formation of an elongated article having lengthwise corrugations, means for heating the resin material to solidify it while it is passing through said passage, and a puller mechanism for pulling the solidified article from the outlet opening, the puller mechanism comprising opposed pairs of pulling elements having transversely corrugated gripping surfaces arranged to engage the article being made along a curved feed path representing a continuation of the curved feed path through the forming passage.

References Cited

UNITED STATES PATENTS

| | | | |
|---|---|---|---|
| 1,584,283 | 5/1926 | Fraser | 18—12 |
| 1,661,069 | 2/1928 | Hartung | 18—12 X |
| 2,508,293 | 5/1950 | Powell | 25—39 X |
| 2,977,630 | 4/1961 | Bozler | 18—45 X |
| 3,142,091 | 7/1964 | Curtis | 18—12 |
| 3,212,132 | 10/1965 | Westlake. | |

WILLIAM J. STEPHENSON, *Primary Examiner.*